United States Patent Office 3,092,639
Patented June 4, 1963

3,092,639
2,2-DIMETHYL-1-(SUBSTITUTED PHENYL)-1,3-DIHYDROXYPROPANES
Kurt Kulka, New York, N.Y., assignor to Fritzsche Brothers, Inc., New York, N.Y., a corporation of New York
No Drawing. Filed Dec. 2, 1960, Ser. No. 73,203
7 Claims. (Cl. 260—340.5)

This invention relates to 2,2-dimethyl-1-(substituted phenyl)-1,3-dihydroxypropanes and processes of producing them.

The 2,2-dimethyl-1-(substituted phenyl)-1,3-dihydroxypropanes of this invention have the formula:

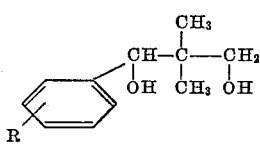

in which R may be one or more alkyl groups, desirably having less than 6 carbon atoms, one or more halogens, one or more hydroxy groups or the methylenedioxy group. Desirably, R represents not more than two substituents.

The 2,2-dimethyl-1-(substituted phenyl)-1,3-dihydroxypropanes are produced by reacting two moles of isobutyraldehyde, one mole of an alkali metal hydroxide and one mole of a substituted benzaldehyde having the formula:

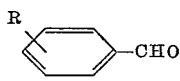

in which R represents the same substituent or substituents as earlier stated. Desirably, a small molar excess of the alkali metal hydroxide and isobutyraldehyde is employed. The reaction is preferably conducted in an inert solvent such as methanol in which all reactants are soluble. The reaction may be represented as follows:

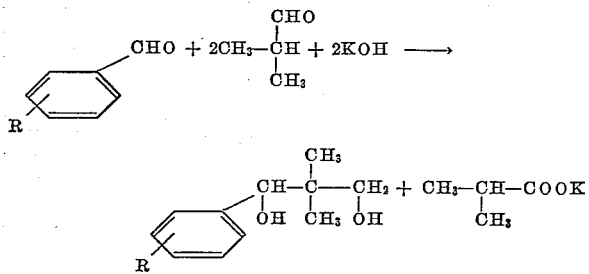

The process of producing the 2,2-dimethyl-1-(substituted phenyl)-1,3-dihydroxypropane is conveniently conducted by preparing a solution of 6½ moles of isobutyraldehyde and 3 moles of the substituted benzaldehyde in 200 ml. of methanol. This solution is added with agitation over a period of 4½ hours at a temperature of 12–16° C. to 3.2 moles of potassium hydroxide dissolved in 700 ml. of methanol. The reaction mixture is agitated for an additional 12 hours at room temperature. The reaction mixture is then neutralized with acetic acid. Approximately 800 ml. of methanol are distilled off and the residue is washed with 800 ml. of water. The desired 2,2-dimethyl-1-(substituted phenyl) - 1,3 - dihydroxypropane is recovered by fractional distillation under vacuum, or if it is crystalline, by recrystallization from a suitable solvent.

The 2,2-dimethyl-1-(substituted phenyl)-1,3-dihydroxypropanes of this invention are mild sedatives when administered to animals. They can be converted into the corresponding dicarbamates, some of which manifest a tranquilizing effect in animals. The dicarbamates may be produced by reacting a 2,2-dimethyl-1-(substituted phenyl)-1,3-dihydroxypropane with urea or urethane, or by reaction with an isocyanate, such as phenylisocyanate. The acetals obtained from the glycols of this invention with various aldehydes, such as the acetals obtained by the reaction of formaldehyde or heptaldehyde with 2,2-dimethyl-1-(4,5 - methylenedioxyphenyl)-1,3-dihydroxypropane, are effective synergists for pyrethrin and allethrin insecticides. These acetals have delicate flowery odors which enable their effective use in perfume compositions. Such acetals may be produced by reacting a glycol of this invention with an aldehyde. For example, the heptaldehyde acetal obtained by reaction of 2,2-dimethyl-1-(4,5-methylenedioxyphenyl) - 1,3 - dihydroxypropane is produced by heating in a container provided with a water trap 1 mole of 2,2-dimethyl-1-(4,5-methylenedioxyphenyl)-1,3-dihydroxypropane with 2.2 moles of heptaldehyde with 400 ml. of toluene and 20 ml. of 85% phosphoric acid used as a catalyst. After 40 ml. of water is formed, the reaction mass is cooled and neutralized with aqueous sodium hydroxide. The resulting neutralized reaction mass is washed with 200 ml. of water and the emulsion which is sometimes formed is broken up with a small amount of acetone. The organic layer is separated from the aqueous layer and is fractionated without a column. The main section boils at 147°–190° C. at 1½ mm. On redistillation, the product boils at 152°–153° C. at .25 mm. It is a light yellow liquid having an R.I. at 20° C. of 1.5088. The heptaldehyde acetal obtained by reaction involving 2,2-dimethyl-1-(4,5-methylenedioxyphenyl)-1,3-dihydroxypropane is an effective synergist for pyrethrin and allethrin insecticides. It is also of value as a component in perfume compositions.

A more comprehensive understanding of this invention is obtained by reference to the following examples:

EXAMPLE 1

Preparation of 2,2-Dimethyl-1-(4,5-Methylenedioxyphenyl)-1,3-Dihydroxypropane

Over a period of 3 hours there was added to 212 g. of 85% potassium hydroxide dissolved in 700 ml. of methanol at a temperature of 11° to 12° C. 450.4 g. (3 moles) of piperonal and 469 g. of isobutyraldehyde dissolved in 200 ml. of methanol. Agitation was maintained during the addition and continued at a temperature of 12–16° C. for a period of 4¼ hours after the addition. The temperature of the mixture was allowed to rise to room temperature (26° C.) and agitated overnight (about 16 hours). The mixture was then acidified with acetic acid. About 750 ml. of methanol was distilled off under agitation. The mixture was then permitted to cool and 1500 ml. of water was added with agitation. The solid material which settled out was filtered on a Büchner funnel. It was washed two times with 50 ml. of water and then placed in a flask to which 600 ml. of benzene was added. The resulting solution was refluxed with a water trap to remove the water. 200 ml. of hexane was added to the benzene solution and the solution was permitted to cool under agitation. (In one case, an additional 400 ml. of hexane was added.). Crystals of the glycol formed which were collected on a Büchner funnel. The yield was 456 grams with an additional 30 grams obtained after partial evaporation of the mother liquor. The melting point of the crystals was 89.2–91° C. The purity was 97% and the yield 72.5% of the theoretical. On recrystallization from a 80–20 hexane-benzene mixture, crystals of 2,2-dimethyl - 1-(4,5 - methylenedioxyphenyl)-1,3-propandiol of a purity of 99.5% were obtained.

EXAMPLE 2

*Preparation of 2,2-Dimethyl-1-(4-Chlorophenyl)-1,3-Dihydroxypropane*

Over a period of 3 hours, there was added to 212 grams of 85% potassium hydroxide in 700 ml. of methanol at a temperature of 10–12° C. under agitation a solution of 423 grams (3 moles) of p-chlorobenzaldehyde, 469 grams (6½ moles) of isobutyraldehyde and 200 ml. of methanol. A white crystalline mixture resulted. Agitation was continued at 11° C. for an additional 3 hours. The mixture stood over the weekend for about 60 hours. Agitation was continued at room temperature for 5 hours and the mixture was then neutralized with acetic acid. 630 ml. of methanol were distilled off under agitation. The mixture was permitted to cool and 1000 ml. of water were then added under agitation. The desired glycol precipitated as crystals and was collected on a Büchner funnel, washed two times with 500 ml. of water and once with 250 ml. of benzene. The resulting crystals had a melting point of 97–104° C. To remove any adhering water, the crystals and 300 ml. of benzene were refluxed under agitation with a water trap. The resulting solution was permitted to cool and the desired glycol crystallized under agitation. It was filtered on a Büchner funnel. The yield was 450 grams or 70% of the theoretical. The melting point of the glycol was 107–109° C. and its purity was 99.4%.

EXAMPLE 3

*Preparation of 2,2-Dimethyl-1-(2-Hydroxyphenyl)-1,3-Dihydroxypropane*

424 grams of 86% potassium hydroxide (6½ moles) were dissolved in 1,700 ml. of methanol. To this solution was added a solution of 367 grams (3 moles) of salicylaldehyde and 469 grams (6½ moles) of isobutyraldehyde in 200 ml. of methanol. The addition was made over a period of 4 hours and 45 minutes at a temperature of 10 to 16° C. under efficient agitation. After the addition, the reaction mixture was agitated at 40°–43° C. for 2 hours. It stood over night at room temperature (18 hours). The next day the reaction mixture was agitated and acidified with acetic acid to a litmus end point and then with hydrochloric acid to a Congo red-paper end point. 500 ml. of water was added and most of the methanol distilled off under agitation from a steam bath. The remaining product separated into two layers. The organic (upper) layer was washed with 200 ml. of water, 100 ml. of sodium bicarbonate solution and again 200 ml. of water. It was then fractionated through a 2 ft. Vigreux column. There were recovered:

310.7 g. salicylaldehyde and isobutyraldehyde
18 g. intermediate section
158.4 g. main section, which was the 2,2-dimethyl-1-(2-hydroxyphenyl)-1,3-dihydroxypropane, a light yellow liquid having a boiling point of 149–152° at 3 mm. and representing a yield of 27% of the theoretical. It had an R.I. at 20° C. of 1.5125.

EXAMPLE 4

*Preparation of 2,2-Dimethyl-1-(Methylphenyl)-1,3-Dihydroxypropane*

To a solution of 212 g. of 85% potassium hydroxide in 700 ml. of methanol was added a solution of 360 g. (3 moles) of tolylaldehyde and 469 g. (6½ moles) of isobutyraldehyde in 200 ml. of methanol. The tolylaldehyde comprises a mixture of the 3 isomeric methylbenzaldehydes; the meta-methylbenzaldehyde is predominant. The addition was made in 4½ hours at a temperature of 12–16° C. The appearance of the reaction mixture was cloudy and syrupy. Agitation was continued at room temperature over night. The reaction mass was acidified with acetic acid. 800 ml. of methanol was distilled off under agitation from a steam bath. The remaining product separated from the water and the residual solvent was distilled off in vacuum. The final product was a mixture of the three glycol isomers and was a heavy, transparent liquid having a purity of 97.5%. The yield approximated the theoretical.

EXAMPLE 5

*Preparation of 2,2-Dimethyl-1-(4-Isopropylphenyl)-1,3-Dihydroxypropane*

To a solution of 212 g. of 85% potassium hydroxide in 700 ml. of methanol was added a solution of 444 g. (3 moles) of cuminal and 469 g. (6½ moles) of isobutyraldehyde under agitation, over a period of 3 hours, at a temperature of 12–13° C. The reaction was exothermic and cooling was required. During the addition, the reaction mass became cloudy, yellow and viscous. After the addition, agitation was continued for 4½ hours at 12–16° C. and over night at room temperature. Next day, the reaction product was made slightly acidic with acetic acid. A clear solution resulted. 650 ml. of methanol was distilled off under agitation. 200 ml. of benzene was added. The resulting solution was washed with 1200 ml. of water and with two additional 500 ml. of warm water. After separation from the water and distilling off of the benzene, the reaction product was fractionated through an 8 inch Vigreux column. The result of the fractionation was as follows:

| Temp., Vapor, °C. | Temp., Flask, °C. | Vac. | cc. | wt., g. | |
|---|---|---|---|---|---|
| 67–146 | 114–165 | 2 | 98 | 95 | Front-Section. |
| 147–161 | 165–202 | 3 | 527 | 527 | Main-Section. |
| Residue |  |  |  | 50 | |
|  |  |  |  | 672 | |

The main-section crystallized on standing. After recrystallization from hexane, the 2,2-dimethyl-1-(3-isopropylphenyl)-1,3-dihydroxypropane had a melting point of 58–60° C. Its purity was 99% and it yield was 79% of the theoretical.

EXAMPLE 6

*Preparation of 2,2-Dimethyl-1-(2-Chlorophenyl)-1,3-Dihydroxypropane; 2,2-Dimethyl-1-(2,4-Dichlorophenyl)-1,3-Dihydroxypropane; 2,2-Dimethyl-1-(3,4-Dichlorophenyl)-1,3-Dihydroxypropane*

Other chloro substituted phenyl glycols were produced in accordance with the method described in Example 2. In such production, the appropriate chlorobenzaldehydes were employed instead of the p-chlorobenzaldehyde used in Example 2. Physical constants and the yields obtained were as follows:

(a) 2,2 - dimethyl-1-(2-chlorophenyl)-1,3-dihydroxypropane:
  Heavy syrupy liquid
  Boiling point, 140° C. at 1 mm.
  R.I. 20° C., 1.5453
  Yield, 49% of the theoretical
  Purity, 97%

(b) 2,2 - Dimethyl-1-(2,4-dichlorophenyl)-1,3-dihydroxypropane:
  Heavy syrupy liquid
  Boiling point, 169–172° C. at 2 mm.
  R.I. 20° C., 1.5455
  Yield, 45% of the theoretical
  Purity, 98%

(c) 2,2 - dimethyl-1-(3,4-dichlorophenyl)-1,3-dihydroxypropane:
  Melting point, 72–74° C.
  Yield, 77% of the theoretical
  Purity, 98%

What is claimed is:
1. A 2,2 - dimethyl - 1 - (substituted phenyl) - 1,3 - dihydroxypropane having the formula:

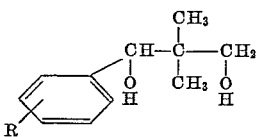

in which R represents a member selected from the class consisting of an hydroxy group, a methylenedioxy group, a chlorine atom and two chlorine atoms.

2. 2,2 - dimethyl - 1 - (4,5 - methylenedioxyphenyl)-1,3-dihydroxypropane.

3. 2,2 - dimethyl - 1 - (4 - chlorophenyl) - 1,3 - dihydroxypropane.

4. 2,2 - dimethyl - 1 - (2 - chlorophenyl) - 1,3 - dihydroxypropane.

5. 2,2 - dimethyl - 1 - (2,4 - dichlorophenyl) - 1,3 - dihydroxypropane.

6. 2,2 - dimethyl - 1 - (3,4 - dichlorophenyl) - 1,3 - dihydroxypropane.

7. 2,2 - dimethyl - 1 - (2-hydroxyphenyl) - 1,3 - dihydroxypropane.

References Cited in the file of this patent

Whitmore et al.: Jour. Amer. Chem. Soc., 63:126–127 (1941) (2 pages).

Tilichenko: Chem. Abstracts, 50: 13, 838 (1956) 1 page.